(12) United States Patent
Khatib et al.

(10) Patent No.: US 11,588,333 B2
(45) Date of Patent: Feb. 21, 2023

(54) MICROGRID POWER FLOW MONITORING AND CONTROL

(71) Applicant: Schweitzer Engineering Laboratories, Inc., Pullman, WA (US)

(72) Inventors: Abdel Rahman Khatib, Pullman, WA (US); Niannian Cai, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 17/739,634

(22) Filed: May 9, 2022

(65) Prior Publication Data

US 2022/0271530 A1   Aug. 25, 2022

Related U.S. Application Data

(62) Division of application No. 16/938,176, filed on Jul. 24, 2020, now Pat. No. 11,368,048, which is a division of application No. 15/644,323, filed on Jul. 7, 2017, now Pat. No. 10,763,695.

(60) Provisional application No. 62/366,740, filed on Jul. 26, 2016.

(51) Int. Cl.
*H02J 3/38* (2006.01)
*H02J 13/00* (2006.01)
*H02J 3/00* (2006.01)
*G05B 15/02* (2006.01)
*H02J 3/18* (2006.01)

(52) U.S. Cl.
CPC .............. *H02J 3/381* (2013.01); *G05B 15/02* (2013.01); *H02J 3/00* (2013.01); *H02J 13/00* (2013.01); *H02J 13/00002* (2020.01); *H02J 13/00017* (2020.01); *H02J 3/18* (2013.01); *Y02B 70/30* (2013.01); *Y02E 40/30* (2013.01); *Y02E 40/70* (2013.01); *Y02E 60/00* (2013.01); *Y04S 10/12* (2013.01); *Y04S 10/30* (2013.01); *Y04S 20/221* (2013.01)

(58) Field of Classification Search
CPC ... H02J 3/381; H02J 13/00; H02J 3/18; G05B 15/02; Y02E 40/30; Y02E 40/70; Y02E 60/00; Y04S 10/12
See application file for complete search history.

(56) References Cited

U.S. PATENT DOCUMENTS

| | | | |
|---|---|---|---|
| 2004/0124812 A1* | 7/2004 | Delmerico | H02J 3/241 322/29 |
| 2006/0208574 A1* | 9/2006 | Lasseter | H02J 3/38 307/69 |
| 2014/0100705 A1* | 4/2014 | Shi | H02J 3/242 700/293 |

(Continued)

*Primary Examiner* — Mohammad Ali
*Assistant Examiner* — Vincent W Chang
(74) *Attorney, Agent, or Firm* — Justin K. Flanagan; Richard M. Edge

(57) ABSTRACT

A microgrid power flow monitoring and control system is described herein. The control system may determine active and reactive power sharing shortage on the electric power delivery system. The control system may utilize the control strategies of generation units, such as ISO control, droop control and constant power control to estimate power flow within a microgrid or other isolated system. A control strategy of one or more generators may be modified based on the determined power flow.

4 Claims, 16 Drawing Sheets

(56) References Cited

U.S. PATENT DOCUMENTS

| | | | | |
|---|---|---|---|---|
| 2014/0316604 A1* | 10/2014 | Ortjohann | ............... | H02J 3/46 |
| | | | | 700/298 |
| 2015/0054339 A1* | 2/2015 | Zhao | ............... | H02J 3/381 |
| | | | | 307/24 |
| 2015/0094871 A1* | 4/2015 | Bhageria | ............... | H02J 13/00017 |
| | | | | 700/297 |
| 2015/0311716 A1* | 10/2015 | He | ............... | H02J 3/50 |
| | | | | 700/287 |
| 2017/0009744 A1* | 1/2017 | Brogan | ............... | G05F 1/455 |
| 2017/0077700 A1* | 3/2017 | Sun | ............... | H02J 3/06 |

\* cited by examiner

TABLE I  GENERATION INFORMATION (PU) OF 30 BUS SYSTEM

| NO. | Pref | Vref | Pmax | Pmin | Qmax | Qmin | Droop |
|---|---|---|---|---|---|---|---|
| 1 | 0.2354 | 1.0 | 0.8 | 0 | 0.8 | -0.2 | 0.04 |
| 2 | 0.6097 | 1.0 | 0.8 | 0 | 0.6 | -0.2 | 0.02 |
| 3 | 0.2159 | 1.0 | 0.5 | 0 | 0.625 | -0.15 | 0.04 |
| 4 | 0.2691 | 1.0 | 0.55 | 0 | 0.487 | -0.15 | 0.03 |
| 5 | 0.1920 | 1.0 | 0.4 | 0 | 0.4 | -0.1 | 0.04 |
| 6 | 0.37 | 1.0 | 0.4 | 0 | 0.447 | -0.15 | 0.05 |

FIG. 6

TABLE II  GENERATION RESULTS FOR MULTIPLE ISLANDS

| Gen No. | Generation Power (pu) | | | | | |
|---|---|---|---|---|---|---|
| | MATLAB | | RTDS | | Error | |
| | P | Q | P | Q | P | Q |
| 1 | 0.363 | -0.026 | 0.363 | -0.025 | 0 | 0.001 |
| 2 | 0.610 | 0.379 | 0.610 | 0.379 | 0 | 0 |
| 3 | 0.216 | 0.403 | 0.216 | 0.403 | 0 | 0 |
| 4 | 0.169 | 0.058 | 0.169 | 0.058 | 0 | 0 |
| 5 | 0.192 | 0.084 | 0.192 | 0.084 | 0 | 0 |
| 6 | 0.370 | 0.116 | 0.370 | 0.116 | 0 | 0 |

FIG. 7

TABLE III  VOLTAGE RESULTS FOR MULTIPLE ISLANDS

| Bus No. | Bus Voltage (pu) | | Error |
| --- | --- | --- | --- |
| | MATLAB | RTDS | |
| | Voltage | Voltage | Voltage |
| 1 | 1.0 | 1.0 | 0 |
| 2 | 1.0 | 1.0 | 0 |
| 7 | 0.964 | 0.964 | 0 |
| 8 | 0.955 | 0.955 | 0 |
| 13 | 1.0 | 1.0 | 0 |
| 21 | 0.993 | 0.993 | 0 |
| 22 | 1.0 | 1.0 | 0 |
| 23 | 1.0 | 1.0 | 0 |
| 27 | 1.0 | 1.0 | 0 |
| 30 | 0.968 | 0.968 | 0 |

FIG. 8

TABLE IV GENERATION RESULTS FOR GRID-CONNECTED SYSTEM AT NOMINAL FREQUENCY

| Gen No. | Generation Power (pu) | | | | | |
|---|---|---|---|---|---|---|
| | MATLAB | | RTDS | | Error | |
| | P | Q | P | Q | P | Q |
| 1 | 0.260 | -0.010 | 0.260 | -0.011 | 0 | 0.001 |
| 2 | 0.610 | 0.320 | 0.610 | 0.321 | 0 | 0.001 |
| 3 | 0.216 | 0.396 | 0.216 | 0.396 | 0 | 0 |
| 4 | 0.269 | 0.105 | 0.269 | 0.105 | 0 | 0 |
| 5 | 0.192 | 0.080 | 0.192 | 0.079 | 0 | 0.001 |
| 6 | 0.370 | 0.114 | 0.370 | 0.113 | 0 | 0.001 |

FIG. 9

TABLE V  VOLTAGE RESULTS FOR GRID-CONNECTED SYSTEM AT NOMINAL FREQUENCY

| Bus No. | Bus Voltage (pu) | | |
| --- | --- | --- | --- |
| | MATLAB | RTDS | Error |
| | Voltage | Voltage | Voltage |
| 1 | 1.0 | 1.0 | 0 |
| 2 | 1.0 | 1.0 | 0 |
| 7 | 0.967 | 0.967 | 0 |
| 8 | 0.961 | 0.961 | 0 |
| 13 | 1.0 | 1.0 | 0 |
| 21 | 0.993 | 0.993 | 0 |
| 22 | 1.0 | 1.0 | 0 |
| 23 | 1.0 | 1.0 | 0 |
| 27 | 1.0 | 1.0 | 0 |
| 30 | 0.968 | 0.968 | 0 |

FIG. 10

TABLE VI  GENERATION RESULTS FOR ISLANDED SYSTEM WITH DROOP DGs

| Gen No. | Generation Power (pu) | | | | | |
|---|---|---|---|---|---|---|
| | MATLAB | | RTDS | | Error | |
| | P | Q | P | Q | P | Q |
| 1 | 0.180 | 0.007 | 0.180 | 0.006 | 0 | 0.001 |
| 2 | 0.536 | 0.323 | 0.536 | 0.322 | 0 | 0.001 |
| 3 | 0.465 | 0.312 | 0.466 | 0.311 | 0.001 | 0.001 |
| 4 | 0.218 | 0.124 | 0.218 | 0.123 | 0 | 0.001 |
| 5 | 0.164 | 0.100 | 0.164 | 0.099 | 0 | 0.001 |
| 6 | 0.348 | 0.123 | 0.348 | 0.123 | 0 | 0 |

FIG. 11

TABLE VII  VOLTAGE RESULTS FOR ISLANDED SYSTEM WITH DROOP DGs

| Bus No. | Bus Voltage (pu) | | |
|---|---|---|---|
| | MATLAB | RTDS | Error |
| | Voltage | Voltage | Voltage |
| 1 | 1.0 | 1.0 | 0 |
| 2 | 1.0 | 1.0 | 0 |
| 7 | 0.968 | 0.969 | 0.001 |
| 8 | 0.962 | 0.962 | 0 |
| 13 | 1.0 | 1.0 | 0 |
| 21 | 0.993 | 0.993 | 0 |
| 22 | 1.0 | 1.0 | 0 |
| 23 | 1.0 | 1.0 | 0 |
| 27 | 1.0 | 1.0 | 0 |
| 30 | 0.968 | 0.968 | 0 |

FIG. 12

TABLE VIII GENERATION RESULTS FOR ISLANDED SYSTEM WITH LIMIT-P DROOP DGs

| Gen No. | Generation Power (pu) | | | | | |
|---|---|---|---|---|---|---|
| | MATLAB | | RTDS | | Error | |
| | P | Q | P | Q | P | Q |
| 1 | 0.348 | -0.052 | 0.348 | -0.052 | 0 | 0.004 |
| 2 | 0.260 | 0.397 | 0.260 | 0.401 | 0 | 0.002 |
| 3 | 0.286 | 0.391 | 0.286 | 0.399 | 0 | 0 |
| 4 | 0.372 | 0.093 | 0.373 | 0.093 | 0.001 | 0 |
| 5 | 0.248 | 0.056 | 0.248 | 0.056 | 0 | 0 |
| 6 | 0.4 | 0.124 | 0.4 | 0.124 | 0 | 0 |

FIG. 13

TABLE IX  VOLTAGE RESULTS FOR ISLANDED SYSTEM WITH LIMIT-P DROOP DGs

| Bus No. | Bus Voltage (pu) | | |
|---|---|---|---|
| | MATLAB | RTDS | Error |
| | Voltage | Voltage | Voltage |
| 1 | 1.0 | 1.0 | 0 |
| 2 | 1.0 | 1.0 | 0 |
| 7 | 0.969 | 0.969 | 0 |
| 8 | 0.964 | 0.964 | 0 |
| 13 | 1.0 | 1.0 | 0 |
| 21 | 0.993 | 0.993 | 0 |
| 22 | 1.0 | 1.0 | 0 |
| 23 | 1.0 | 1.0 | 0 |
| 27 | 1.0 | 1.0 | 0 |
| 30 | 0.968 | 0.968 | 0 |

FIG. 14

TABLE X  GENERATION RESULTS FOR ISLANDED SYSTEM WITH LIMIT-Q DROOP DGs

| Gen No. | Generation Power (pu) | | | | | |
|---|---|---|---|---|---|---|
| | MATLAB | | RTDS | | Error | |
| | P | Q | P | Q | P | Q |
| 1 | 0.260 | 0.047 | 0.260 | 0.047 | 0 | 0 |
| 2 | 0.610 | 0.250 | 0.610 | 0.250 | 0 | 0 |
| 3 | 0.216 | 0.402 | 0.216 | 0.402 | 0 | 0 |
| 4 | 0.269 | 0.109 | 0.269 | 0.109 | 0 | 0 |
| 5 | 0.192 | 0.081 | 0.192 | 0.081 | 0 | 0 |
| 6 | 0.370 | 0.117 | 0.370 | 0.117 | 0 | 0 |

FIG. 15

TABLE XI  VOLTAGE RESULTS FOR ISLANDED SYSTEM WITH LIMIT-Q DROOP DGs

| Bus No. | Bus Voltage (pu) | | |
|---|---|---|---|
| | MATLAB | RTDS | Error |
| | Voltage | Voltage | Voltage |
| 1 | 1.0 | 1.0 | 0 |
| 2 | 0.997 | 0.997 | 0 |
| 7 | 0.965 | 0.965 | 0 |
| 8 | 0.959 | 0.959 | 0 |
| 13 | 1.0 | 1.0 | 0 |
| 21 | 0.993 | 0.993 | 0 |
| 22 | 1.0 | 1.0 | 0 |
| 23 | 1.0 | 1.0 | 0 |
| 27 | 1.0 | 1.0 | 0 |
| 30 | 0.968 | 0.968 | 0 |

FIG. 16

MICROGRID POWER FLOW MONITORING AND CONTROL

RELATED APPLICATIONS

This application claims priority under 35 U.S.C. §§ 120 and 121 as a divisional application of U.S. patent application Ser. No. 16/938,176 filed on 24 Jul. 2020 naming Abdel Rahman Khatib and Niannian Cai as inventors, and titled "Microgrid Power Flow Monitoring and Control"; which claims priority under 35 U.S.C. §§ 120 and 121 as a divisional application of U.S. patent application Ser. No. 15/644,323 filed on 7 Jul. 2017 naming Abdel Rahman Khatib and Niannian Cai as inventors and titled "Microgrid Power Flow Monitoring and Control"; which claims priority under 35 U.S.C. § 119 to U.S. Provisional Patent Application No. 62/366,740 filed on 26 Jul. 2016, titled "Microgrid Power Flow Monitoring and Control," each of which are hereby incorporated by reference in their entireties.

TECHNICAL FIELD

This disclosure relates to systems and methods for monitoring power flow in an electric power delivery system. More particularly, this disclosure relates to monitoring power flow on buses of an electric power delivery system in a grid-connected and islanded modes in various operational states.

BRIEF DESCRIPTION OF THE DRAWINGS

This disclosure includes illustrative embodiments that are non-limiting and non-exhaustive. Reference is made to certain of such illustrative embodiments that are depicted in the figures described below.

FIG. 6 includes a table showing generating capacity and droop values of the 30 Bus System of FIG. 5 for simulations, according to one embodiment.

FIG. 7 illustrates generation results for a multiple islanded mode for the 30 Bus System with one large island and one small island, according to one embodiment.

FIG. 8 illustrates voltage results for the multiple islanded mode for the 30 Bus System with one large island and one small island, according the embodiment described in conjunction with FIG. 7.

FIG. 9 illustrates generation results for the 30 Bus System connected to a 60 Hz grid to provide infinite active and reactive power support, according to one embodiment.

FIG. 10 illustrates voltage results for the 30 Bus System connected to the 60 Hz grid to provide infinite active and reactive power support, according the embodiment described in conjunction with FIG. 9.

FIG. 11 illustrates generation results for the 30 Bus System in droop mode with generator 3 providing 50 MW, according to one embodiment.

FIG. 12 illustrates voltage results for the 30 Bus System in droop mode, according the embodiment described in conjunction with FIG. 11.

FIG. 13 illustrates generation results for the 30 Bus System in another embodiment of a droop mode with generator 2 providing 10.97 MW, according to one embodiment.

FIG. 14 illustrates voltage results for the 30 Bus System in the droop mode of FIG. 13, according to one embodiment.

FIG. 15 illustrates generation results for the 30 Bus System with the reactive power limit of generator 2 decreased to 25 MVar, according to one embodiment.

FIG. 16 illustrates voltage results for the 30 Bus System with generator 2 at its maximum reactive power limit, according to one embodiment.

DETAILED DESCRIPTION

Figure 1:
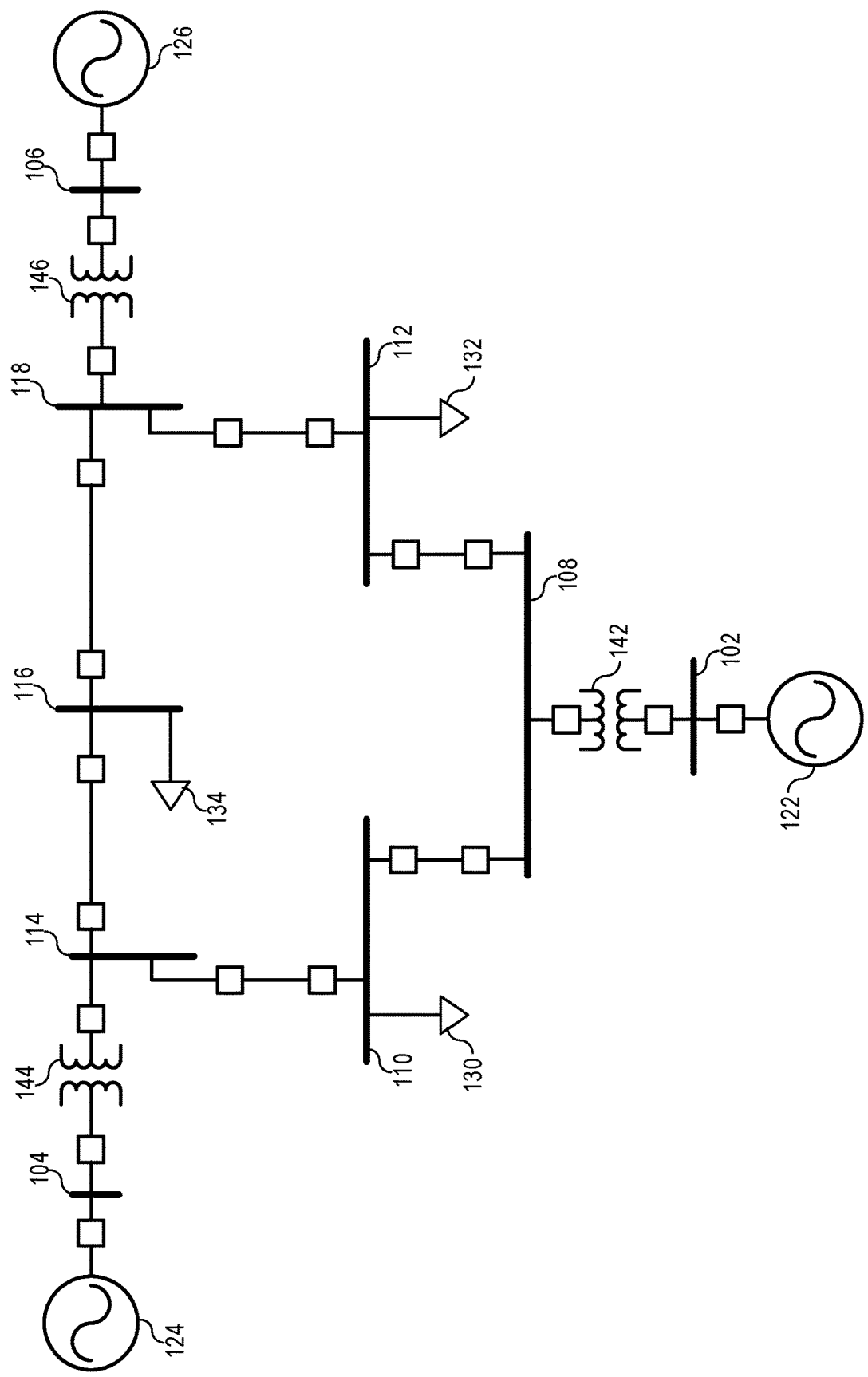
FIG. 1 illustrates an embodiment of a simplified one-line diagram of an electric power delivery system.

Electrical power generation and delivery systems are designed to generate, transmit, and distribute electrical energy to loads. Electrical power generation and delivery systems include a variety of equipment, such as electrical generators, electrical motors, power transformers, conductive cables for electrical distribution and/or communication (referred to herein generally as "transmission lines"), circuit breakers, switches, buses, transmission and/or feeder lines, voltage regulators, capacitor banks, and the like. Such equipment may be monitored, controlled, automated, and/or protected using intelligent electronic devices (IEDs) that receive electric power system information from the equipment, make decisions based on the information, and provide monitoring, control, protection, and/or automation outputs to the equipment.

Electric power delivery systems are used to transmit electric power from generation to load, and are monitored and controlled to balance the electric power generation and consumption. As described in more detail below, electric power delivery control and monitoring systems often make certain assumptions concerning the available electric power from a larger utility provided to a microgrid. Such assumptions may result in poor or incorrect modeling of microgrid and islanded electric power delivery systems. The systems and methods described herein provide an alternative, and potentially more accurate, approach for determining, monitoring and/or controlling power flow among buses in any electric power delivery system, but particularly in microgrids and islanded systems.

Existing power flow algorithms for transmission and distribution systems, such as the Newton Raphson method and others, assume the availability of a slack bus that can provide unlimited active and reactive power to maintain the voltage magnitude, frequency, and power balance of the system. For instance, the active power of generators and the frequency of the system are often modeled as constants in such algorithms. These assumptions may be suitable for large-scale interarea power systems and small systems connected to a stable power grid. However, in isolated industrial systems and microgrids, the assumptions made in traditional power flow algorithms frequently result in erroneous calculations.

Some isolated systems may have only one or a few distributed generations (e.g., generators or generator units) with limited capacity. The isolated system may not have a strong source that can be realistically modeled as having unlimited capacity to act as a slack bus. Moreover, the frequency of industrial and microgrid systems may vary near the nominal frequency based on generation and load. For example, a plurality of distributed generators may be controlled in droop mode, and the variation of the loads may affect the frequency of the system. Additionally, the active power outputs of distributed generation within an industrial or microgrid system may be controlled as a constant or in an isochronous sharing mode (ISO mode), unless they reach their maximum or minimum limits.

In these situations, a controller may control some of the distributed generators in droop mode with their active power regulated based on the frequency value of the system, unless the generators reach their maximum or minimal limits. The load on induction and/or synchronous motors in the system may be frequency dependent and, since the frequency in the system may vary slightly, load frequency characteristics may become relevant to the system evaluation. Furthermore, the reactive power control of distributed generators in industrial systems or microgrids may be in various modes, such as voltage control mode, constant MVar mode, power factor mode, or voltage droop mode.

Thus, isolated systems, such as industrial and microgrid systems, differ from traditional systems due to one or more of the following characteristics: isolated systems may lack a slack bus with unlimited capacity; isolated systems may experience frequency variation; isolated systems may utilize multi-generator ISO sharing modes; and isolated system may have active frequency-dependent load values. Systems may also have active voltage-dependent load values. Thus, whether the dependency is based on voltage and/or frequency, some load values may be power characteristic-dependent (e.g., frequency-dependent, voltage-dependent, or frequency-dependent and voltage-dependent).

In many instances, microgrids and relatively small grids may not have strong voltage profiles and so the reactive load voltage characteristics may be more impactful than in large grids. Traditional power flow algorithms are unsuitable to accurately calculate power flow of electrical transmission and/or distribution systems that include one or more of the characteristics described above.

Previous attempts to replace or modify the traditional power flow algorithms included one or more shortcomings, such as processing speed, and/or were only suitable for some, but not all or many power system configurations. This disclosure provides a universal power flow (UPF) algorithm that: (i) can account for islanded systems, grid-connected systems at nominal frequency, and grid-connected systems at off-nominal frequency; (ii) can incorporate the active control strategy of distributed generations, including ISO control, droop control, constant power control, voltage regulation, etc.; (iii) can account for various reactive power generation control strategies, including MVAR control, power factor control, voltage control, and voltage droop control; (iv) can account for the limitations of distributed generations, including the active power and reactive power generation limitation of ISO units and droop units; (v) can evaluate system frequency; (vi) can account for frequency dependent active power loads; (vii) can account for frequency dependent reactive power loads; and (viii) can be used to detect a voltage collapse. In some embodiments, systems and methods may be utilized that incorporate all the functionalities described above. In other embodiments, some variable may be safely or reasonably assumed constant and so systems and methods may be employed that incorporate only a subset of the functionalities described above. Thus, any of the various portions of the various embodiments described below may be combined in a wide variety of permutations or combinations.

Transmission and distribution systems, such as microgrids and industrial systems, may operate in grid-connected mode or islanded grid. In a grid-connected mode, the grid may be modeled as an unlimited voltage source to maintain both the voltage of the bus connected to the grid and the frequency at a constant value (e.g., at 60 Hz or 50 Hz). In such a configuration, the distributed generators of the system may be prevented from operating in ISO control mode to avoid potential conflicts with the connected grid. However, in an islanded mode the distributed generators with ISO control or droop control may participate in frequency control and/or regulate their active power output to control the frequency.

In the grid-connected mode, the grids can be treated as ISO units with infinite capability. Accordingly, the output power can be modeled as:

$$P_{Grid_k} = P_{Grid_k}^{Ref} + \alpha_{Grid_k} P_s \quad \text{Equation 1}$$

In Equation 1, $P_{Grid_k}$ represents the active power provided by a grid k, $P_{Grid_k}^{Ref}$ represents the reference power provided by grid k, $\alpha_{Grid_k}$ is the sharing coefficient of the grid k, and $P_s$ is the power shortage in the system. Distributed generators in grid-connected mode can be operated in either droop mode or constant power mode.

In these modes, the variation of active power output is affected by the frequency deviation. Thus, the variation of active power, $\Delta P_{Droop}$, of a droop unit k, is a function of the frequency value per unit, $f_{pu}$, the MW base of the droop unit, $S_{Droop}$, and the droop value, R. The variation of active power of a unit, k, may be expressed as:

$$\Delta P_{Droop\_k} = \frac{(1 - f_{pu}) * S_{Droop\_k}}{R_k} \quad \text{Equation 2}$$

In many embodiments, the variation of active power is associated with a generator capacity or turbine limit. In such embodiments, the output power of the droop unit k, can be expressed as:

$$P_{Droop\_k} = P_{Droop\_k}^{Ref} + \frac{(1 - f_{pu}) * S_{Droop\_k}}{R_k} \quad \text{Equation 3}$$

In Equation 3, $P_{Droop\_k}$ is the output power of droop unit k; $P_{Droop\_k}^{Ref}$ is a reference power value of droop unit k, (potentially at off-nominal frequency). When the frequency of the grid is at nominal frequency, the droop unit is operated at a nominal frequency such that $P_{Droop\_k} = P_{Droop\_k}^{Ref}$. For the distributed generator units with constant power control, its output power is not affected by the grid frequency and its power reference value at off-nominal frequency is equal to the value at nominal frequency:

$$P_{Constant\_k} = P_{Constant\_k}^{Ref} \quad \text{Equation 4}$$

As another example, the reference power value at off-nominal frequency of the droop unit can be expressed as:

$$P_{Droop\_k} = P_{Droop\_k}^{Ref} + \frac{\Delta f \times MVA_{Droop\_k}}{f_N \times R_k} \quad \text{Equation 5}$$

In Equation 5, $\Delta f$ is the frequency deviation in Hz, $MVA_{Droop\_k}$ is the capacity of droop unit k, $f_N$ is the nominal frequency of the system, and $R_k$ is the droop value of droop unit k.

In an islanded mode, the distributed generators can be operated in ISO mode, droop mode, or constant power mode. When the load value changes, the generators in ISO mode will first react to regulate their active power output to maintain power balance and system frequency. In ISO mode, the output power of a unit can be described as:

$$P_{ISO\_k} = P_{ISO\_k}^{Ref} + \alpha_{ISO\_k} \Delta P \qquad \text{Equation 6}$$

Alternatively, the output power of a unit can be described as:

$$P_{ISO\_k} = P_{ISO\_k}^{Ref} + \alpha_{ISO\_k} P_s \qquad \text{Equation 6.1}$$

In Equations 6 and 6.1, $P_{ISO\_k}$ is the generation output of a single ISO unit k, $P_{ISO\_k}^{Ref}$ is the reference point of generation output of the ISO unit k, $\alpha_{ISO\_k}$ is the ISO sharing factor of the ISO unit k, $\Delta P$ (or alternatively, $P_s$) is the active power shortage of the system. The active power shortage of the system may be equal to the total active load, plus the total active power losses, minus a sum of generation reference values, expressible as:

$$P_s = \Sigma P_{Load} + \Sigma P_{loss} - \Sigma P_G^{ref} \qquad \text{Equation 7}$$

As noted above, in the islanded mode, the generators can be operated in a droop mode instead. In droop mode, a generator may modify its active power output based on the frequency of the system. A mathematical expression for the power output of a generator unit k, in droop mode can be expressed using either of Equation 3 or Equation 5 above. In equation 5, $\Delta f$ is the frequency deviation in Hz and can be expressed in terms of active power shortage of the system, $\Delta P$ (or alternatively, $P_s$), as illustrated in Equation 8 below:

$$\Delta f = \frac{P_s}{\sum_{j=1}^{N} \frac{MVA_{droop\_j}}{f_N \times R_j}} \qquad \text{Equation 8}$$

Incorporating Equation 8 into Equation 5, the reference power value at off-nominal frequency of the droop unit can be expressed as:

$$P_{droop\_k} = P_{droop\_k}^{ref} + \frac{MVA_{droop\_k}}{R_k \sum_{j=1}^{N} \frac{MVA_{droop\_k}}{R_j}} P_s \qquad \text{Equation 9}$$

Finally, as noted above, the generators can be operated in a constant mode in which the power reference value at off-nominal frequency is equal to the value at nominal frequency as shown in Equation 4.

In isolated systems, such as microgrids and industrial systems, system frequency may impact the active power consumption of loads. This is particularly true when the systems include induction motors and/or synchronous motors. Load frequency characteristics are described in a publication titled "Load Modeling Assumptions: What is Accurate Enough?" published in *IEEE Trans. Ind. App.*, vol. 52, no. 4, pp. 3611-3619, March 2016 by A. R. Khatib, M. Appannagari, S. Manson and S. Goodall, which publication is hereby incorporated by reference in its entirety. As noted therein, induction motors and synchronous motors may have an active power consumption that is a linear function of frequency when their load torque is constant. For a fan load, the active power may be related to the quadratic function of system frequency. Various forms of load can be modeled using the quadratic form below:

$$P_{Load\_i} = (c_{1i} f_{pu}^2 + c_{2i} f_{pu} + c_{3i}) P_{Load\_i}^N \qquad \text{Equation 10}$$

In Equation 10, $c_{1i}$ represents the percentage of the load on the bus, i, that varies quadratically with respect to frequency, $c_{2i}$ represents the percentage of load on the bus, i, that varies linearly with respect to frequency, $c_{3i}$ represents the percentage of load on the bus, i, that is frequency independent, $f_{pu}$ is the frequency value in per unit, and $P_{Load\_i}^N$ is the active power value of the load on the bus, i, at nominal frequency. Nominal load values may be adjusted based on frequency to calculate a frequency-based load value for the load connected to each bus. The load can alternatively be modeled as provided below in Equation 10.1, wherein function $g_i^P(f)$ indicates the effects of frequency on active power load i and $P_{Load\_i}^N$ is the active power value of the load i at nominal frequency.

$$P_{Load\_i} = g_i^P(f) * P_{Load\_i}^N \qquad \text{Equation 10.1}$$

Microgrids, such as industrial grids, may benefit from a universal power flow model that models reactive control strategies for distributed generators. Such reactive control strategies may include MVar control, power factor control, and/or voltage droop control. Bus voltage control mode may have the objective of maintaining the voltage magnitude of one or more buses, unless or until the reactive power output of one or more distributed generators reaches a maximum or minimum limit. Unlike other buses, the voltage magnitude of voltage control bus is a known quantity equal to the reference of the bus voltage control.

The reactive power generation of this bus in bus voltage control mode can be evaluated in each iteration as follows:

$$Q_{Gen\_i}^{t+1} = Q_{Load\_i} + |V_i^t| \Sigma_{n=1}^{N} |Y_{in}||V_n^t| \sin(\delta_i^t - \delta_n^t - \theta_{in}) \qquad \text{Equation 11}$$

In Equation 11 above, $Q_{Gen\_i}^{t+1}$ is the reactive power generation of bus i at iteration t+1; the superscript t represents the iteration number; $V_i^t$ and $V_n^t$ are voltage magnitude evaluations of bus i and bus n at iteration t; $\delta_i^t$ and $\delta_n^t$ are the voltage angle evaluations of bus I and bus n at iteration t; and $Y_{in}$ and $\theta_{in}$ are the magnitude and angle of Y bus matrix element related to bus i and bus n.

In bus voltage control mode, a determination that the reactive power generation is greater than the maximum capability of the generators may result in a transition to MVar control mode with the reactive power fixed at a maximum generation value. Conversely, a determination that the reactive power generation is less than the minimum capability of the generators may result in a transition to MVar control mode with the reactive power fixed at a minimum generation value. MVar control mode is used to control the distributed generators to produce a preset amount of reactive power such that the reactive power output is set at a known reference quantity.

The universal power flow model may additionally (or alternatively) be used to evaluate reactive power in a power factor control mode. Distributed generators in a power factor control mode may produce reactive power to satisfy power factor control requirements modeled as:

$$Q_{Gen\_k}^{t+1} = PF_k^{Ref} * P_{Gen\_k}^t \qquad \text{Equation 12}$$

In Equation 12, $Q_{Gen\_k}^{t+1}$ is the reactive power out of a distributed generator unit k at an iteration t+1, $PF_k^{Ref}$ is the reference power factor control for the distributed generator unit k, and $P_{Gen\_k}^t$ is the evaluation of active power output of the distributed generator unit k at iteration t.

The universal power flow model may additionally (or alternatively) be used to evaluate reactive power in a voltage droop control mode. Distributed generators in a voltage droop control mode may produce reactive power modeled as:

$$Q_{Gen\_k} = Q_{Gen\_k}^{Ref} + \frac{V_k^{Ref} - V_k}{R_{q\_k}} \qquad \text{Equation 13}$$

In Equation 13, $Q_{Gen\_k}$ is the reactive power out of a distributed generator unit k, $Q_{Gen\_k}^{Ref}$ is the reference reactive power reference for the distributed generator unit k, $V_k^{Ref}-V_k$ is the difference between the voltage reference and a measured voltage value, an $R_{q\_k}$ is the reactive power droop value of the distributed generator unit k.

Based on the above equations, a reactive power flow model for a plurality of distributed generators connected to a bus can be modeled as:

$$\sum_{k=1}^{m} Q_{Gen_k,i}^{Ref} = \sum_{k=1}^{m} \frac{V_i - V_{k,i}^{Ref}}{R_{k,i}} + Q_{Load\_i} + |V_i|\sum_{n=1}^{N}|Y_{in}||V_n|\cos(\delta_i - \delta_n - \theta_{in}) \qquad \text{Equation 14}$$

In Equation 14, m represents the number of distributed generators in reactive droop control, $Q_{Gen_k,i}^{Ref}$ is the reactive power reference of a distributed generator unit k connected to the bus i, and $R_{k,i}$ represents the reactive power droop value of the distributed generator k connected to the bus i. $Q_{Load\_i}$ represents the reactive power load. However, it is appreciated that the reactive power load consumption is affected by the voltage magnitude. For example, for large induction motors, such as those found in industrial systems, the reactive power consumption has a quadratic relationship with the voltage magnitude and can be modeled as:

$$Q_{Load\_i} = g_i^q(V) * Q_{Load\_i}^N \qquad \text{Equation 15}$$

In Equation 15, $g_i^q(V)$ represents the influence of the voltage magnitude on the reactive load i and $Q_{Load\_i}^N$ is the reactive power load consumption at nominal voltage magnitude.

The equations above apply to each disparate system configurations and modes, but are related to one another such that they can be combined as part of a universal power flow algorithm applicable to diverse electric power delivery systems in various modes or states. The universal power flow algorithm is suitable for a wide variety of industrial level systems, including microgrids, isolated systems, ships, ocean platforms, and the like. The universal power flow algorithm can be used to calculate and/or control the flow of electricity within an isolated system by considering the unique characteristics of the electric power delivery system, the operating mode (e.g., grid-connected at nominal frequency, grid-connected at off-nominal frequency, or islanded), the control strategy of distributed generation (e.g., droop control, isochronous control, or constant power control, etc.), and the limited active and reactive power capacity of distributed generation. The algorithm may be used to calculate, measure, evaluate, and/or control system frequency and provide an indication of frequency deviation or voltage risks.

Thus, the universal power flow model described herein defines relationships for power generation for grid-connected modes and islanded modes that can be combined as a single representation for both active and reactive power. Assuming a specific angle reference, an updated equation for the Newton Raphson Method may be expressed that defines an active power generation vector and a reactive power generation vector for one or more bus in a power transmission and distribution system, regardless of whether the system is grid-connected or islanded, or operating in ISO mode, droop mode, or constant power mode.

A universal power flow model derived from the above equations for a grid-connected bus can be expressed as:

$$P_{grid\_i}^{Ref} + P_{gen\_i}^{Ref} = P_{Load\_i} - \alpha_{grid\_i}P_s + |V_i|\Sigma_{n=1}^N|Y_{in}||V_n|\cos(\delta_i - \delta_n - \theta_{in}) \qquad \text{Equation 16}$$

In Equation 16, $P_{grid\_i}^{Ref}$ is the reference power of the grid connected to bus i. $\alpha_{grid\_i}P_s$ is the sharing coefficient of bus i of the grid. $P_{Load\_i}$ is the active load connected to bus i of the grid. $P_s$ is the power shortage in the system. $V_i$ and $V_n$ are the voltage magnitude of bus i and a bus n, respectively. $Y_{in}$ and $\theta_{in}$ are the magnitude and angle of a Y bus matrix element related to buses i and n. $\delta_i$ and $\delta_n$ are the angles of buses i and n. N is total number of buses in the system.

The last portion (or addend) of Equation 16, $|V_i|\Sigma_{n=1}^N|Y_{in}||V_n|\cos(\delta_i - \delta_n - \theta_{in})$, may be referred to as a "shared value" as it relates to the interrelationship or shared relationships of various buses within the system. If no grids are connected to bus i, $P_{grid\_i}^{Ref}$ and $\alpha_{grid\_i}$ will both be equal to zero.

$P_{Gen\_i}^{Ref}$ is the reference power provided by the generator to bus i. If the distributed generator is in droop control mode, $P_{Gen\_i}^{Ref}$ is calculated using Equation 3. If the distributed generator is in constant power control mode, $P_{Gen\_i}^{Ref}$ is calculated using Equation 4. If bus i does not have a distributed generator, then $P_{Gen\_i}^{Ref}$ is equal to zero.

A universal power flow model derived from the above equations for a non-grid-connected bus can be expressed as:

$$P_{Gen\_i}^{Ref} = P_{Load\_i} + |V_i|\Sigma_{n=1}^N|Y_{in}||V_n|\cos(\delta_i - \delta_n - \theta_{in}) \qquad \text{Equation 17}$$

In Equation 17, $P_{Gen\_i}^{Ref}$ is the reference of active power generation at bus i. Equation 3 can be used to calculate $P_{Gen\_i}^{Ref}$ if the relevant generator is in droop control mode. Alternatively, Equation 4 can be used to calculate $P_{Gen\_i}^{Ref}$ if the relevant generator is in constant control mode. If bus i does not have a generator, then $P_{Gen\_i}^{Ref}$ is equal to 0. As before, $P_{Load\_i}$ is the active load connected to bus i and the other variables are the same as in Equation 10. Specifically, $V_i$ and $V_n$ are the voltage magnitude of bus i and a bus n, respectively. $Y_{in}$ and $\theta_{in}$ are the magnitude and angle of a Y bus matrix element related to buses i and n. $\delta_i$ and $\delta_n$ are the angles of buses i and n. Finally, N is total number of buses in the system.

For a bus with ISO generation, the reference of active power generation at bus i can be expressed as:

$$P_{ISO\_i}^{Ref} + \alpha_{ISO\_i}\Delta P_{Load\_i} = |V_i|\Sigma_{n=1}^N|Y_{in}||V_n|\cos(\delta_i - \delta_n - \theta_{in}) \qquad \text{Equation 18}$$

Solving for $P_{ISO\_i}^{Ref}$ and using $P_s$ notation instead of $\Delta P$, the reference of active power generation at bus i for ISO generation as:

$$P_{ISO\_i}^{Ref} = P_{Load\_i} - \alpha_{ISO\_i}P_s + |V_i|\Sigma_{n=1}^N|Y_{in}||V_n|\cos(\delta_i - \delta_n - \theta_{in}) \qquad \text{Equation 19}$$

If there is no ISO generator regulating system frequency (e.g., either no generators are operating in ISO mode or generators operating in ISO mode have reached maximum or minimal limitations), the distributed generators in droop control will contribute to frequency control. The power flow equation for the bus with generators in droop control can be expressed as:

$$P_{Droop\_i}^{Ref} + \frac{MVA_{droop\_i}}{R_i \sum_{i=1}^{N} \frac{MVA_{droop\_i}}{R_i}} \Delta P - P_{Load\_i} = |V_i| \sum_{n=1}^{N} |Y_{in}||V_n|\cos(\delta_i - \delta_n - \theta_{in})$$
Equation 20

Again, solving for the active power generation, $P_{droop\_i}^{ref}$, and using notation from Equation 3, the active power generation for a bus i, with a generator in droop control can be expressed as:

$$P_{Droop\_i}^{Ref} = P_{Load\_i} - \frac{(1-f_{pu})*S_{Droop\_i}}{R_i} + |V_i|\sum_{n=1}^{N}|Y_{in}||V_n|\cos(\delta_i - \delta_n - \theta_{in})$$
Equation 21

If there is a generation unit regulating system frequency, (e.g., to the nominal 60 Hz or 50 Hz frequency), the power flow equation for the bus with droop generators can be expressed as:

$$P_{Droop\_i}^{Ref} = P_{Load\_i} + |V_i|\Sigma_{n=1}^{N}|Y_{in}||V_n|\cos(\delta_i - \delta_n - \theta_{in})$$ Equation 22

For a bus with constant power generation, the power flow equation can be expressed as:

$$P_{Constant\_i}^{Ref} = P_{Load\_i} + |V_i|\Sigma_{n=1}^{N}|Y_{in}||V_n|\cos(\delta_i - \delta_n - \theta_{in})$$ Equation 23

A universal equation for the active power generation for a bus i can be formed using the forgoing equations as:

$$P_i^{Ref} = (c_{1i}f_{pu}^2 + c_{2i}f_{pu} + c_{3i})P_{Load_i}^N + \beta_i X + |V_i|\Sigma_{n=1}^{N}|Y_{in}||V_n|\cos(\delta_i - \delta_n - \theta_{in})$$ Equation 24

In Equation 24 above, $P_i^{Ref}$ is the sum of power generation reference value and power import value from the grid at bus i. $\beta_i$ is the coefficient of X determined based on the control mode of distributed generators and the operating mode of the system. X is the power shortage of the system, $P_s$, if the system is grid-connected or islanded with ISO generation. X is equal to $f_{pu}$ if the system is islanded without ISO generation. The product of $\beta_i$ and X may be referred to as a control-operating value because it is dependent on the control and/or operating mode of the generators and/or system as a whole. The universal equation for active power generation can be alternatively represented as:

$$P_i^{Ref} = g_i^P(f)*P_{Load\_i}^N + \beta_i X + |V_i|\Sigma_{n=1}^{N}|Y_{in}||V_n|\cos(\delta_i - \delta_n - \theta_{in})$$ Equation 25

In Equation 25, the function $g_i^P(f)$ indicates the effects of frequency on active power load i and the other terms are similar to those described in conjunction with Equation 24.

The reactive power of the system can be similarly summarized as follows:

$$Q_i^{Ref} = Q_{Load\_i} + |V_i|\Sigma_{n=1}^{N}|Y_{in}||V_n|\sin(\delta_i - \delta_n - \theta_{in})$$ Equation 26

Alternatively, the reactive power from a generator can be expressed as:

$$Q_{Gen\_i}^{Ref} = g_i^q(V)*Q_{Load\_i}^N + |V_i|\Sigma_{n=1}^{N}|Y_{in}||V_n|\sin(\delta_i - \delta_n - \theta_{in})$$ Equation 27

For different voltage control strategies, $Q_{Gen\_i}$ is based on one of Equations 11-13. Assuming $\delta_1$ is the angle reference of the system, the updating equation for using the Newton Raphson Method can be expressed as:

$$\begin{bmatrix} \Delta P^{Ref} \\ \Delta Q^{Ref} \end{bmatrix} = \begin{bmatrix} \gamma & \frac{\partial P^{Ref}}{\partial \delta} & \frac{\partial P^{Ref}}{\partial |V|} \\ 0 & \frac{\partial Q^{Ref}}{\partial \delta} & \frac{\partial Q^{Ref}}{\partial |V|} \end{bmatrix} \begin{bmatrix} \Delta X \\ \Delta \delta \\ \Delta |V| \end{bmatrix}$$
Equation 28

In Equation 28, $\Delta P^{Ref}$ (N*1) is the bus active power generation vector, where N is the number of buses in the system. $\Delta Q^{Ref}$ ($N_{PQbus}$*1) is the reactive power generation vector of PQ bus, where $N_{PQbus}$ is the number of PQ buses in the system. $\gamma$(N*1) is the coefficient vector of X.

$$\frac{\partial P^{Ref}}{\partial \delta}(N*(N-1)), \frac{\partial P^{Ref}}{\partial |V|}(N*N_{PQbus}),$$

$$\frac{\partial Q^{Ref}}{\partial \delta}(N_{PQbus}*(N-1)),$$

$$\text{and } \frac{\partial Q^{Ref}}{\partial |V|}(N_{PQbus}*N_{PQbus})$$

are similar to the Jacobian coefficients of conventional power flow analyses.

The $\gamma$ vector is based on the operating mode and shares generation accordingly. The $\gamma$ vector can be defined as:

$$\gamma = [\gamma^1, \gamma^2 \ldots \gamma^n]^T = \frac{\partial P^{Ref}}{\partial X}$$
Equation 29

If the system is utility connected and the bus i is a non-utility bus, $\gamma^i=0$. If bus i, is a utility bus, then $\gamma^i$ will be a non-negative coefficient that is not greater than 1. Specifically, $\gamma^i$ will be equal to the value of increased megawatt (MW) import of utility power connected to bus i if the total system load and loss is increased by 1 MW. If bus i is the only utility bus in the system, then $\gamma^i=1$.

If the system is not connected to the utility and has ISO generation units, but the bus i does not itself have generation units, then $\gamma^i=0$. If the system is not connected to the utility and bus i has ISO generation units, then $\gamma^i$ will be non-negative and not greater than 1. Specifically, $\gamma^i=\Sigma\partial_{ISO}^i$, where $\partial_{ISO}^i$ is the ISO sharing factor of ISO units connected to bus i. $\gamma^i$ will be equal to the value of increased MW generation of the ISO generation connected to bus i, if the total system load and loss is increased by 1 MW. If bus i has the only ISO generation units in the system, then $\gamma^i=1$.

If the system is islanded and has droop units, but no ISO generation units, then X is equal to $f_{pu}$. Thus, for a bus i that does not have droop units connected thereto, $\beta_i=0$ and therefore:

$$\gamma^i = \frac{\partial P_i^{Ref}}{\partial f_{pu}} = (2c_{1i}f_{pu} + c_{2i})P_{Load\_i}^N$$
Equation 30

For the bus i that has droop units, $$\beta_i = \sum_{k=1}^{M} \frac{S^i_{Drdoop\_i}}{R^i_k}$$

and so $\gamma^i$ can be expressed as:

$$\gamma^i = \frac{\partial P^{Ref}_i}{\partial f_{pu}} = (2c_{1i}f_{pu} + c_{2i})P^N_{Load_i} + \sum_{k=1}^{M} \frac{S^i_{Drdoop\_i}}{R^i_k} \quad \text{Equation 31}$$

In Equation 31, $S_{Drdoop\_i}{}^i$ is the MW base of droop unit k connected to the bus i. M is the number of droop units connected to the bus i. $R_k{}^i$ is the droop value of droop unit k connected to bus i.

If the system is islanded and only has constant power units, then $\beta_i=0$ and the expression of $\gamma^i$ is the same as in Equation 30 above.

In some embodiments, the universal power flow model described herein may be used for a system that has been separated into multiple islands. In such an embodiment, an IED may detect and identify (e.g., by monitoring power on transmission and/or distribution lines and/or breakers) each island created by the failure of one or more feeders of the system.

In some embodiments, an IED may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communication processors, computing platforms, programmable logic controllers (PLCs), programmable automation controllers, input and output modules, governors, exciters, statcom controllers, SVC controllers, OLTC controllers, and the like. Further, in some embodiments, IEDs may be communicatively connected via a network that includes, for example, multiplexers, routers, hubs, gateways, firewalls, and/or switches to facilitate communications on the networks, each of which may also function as an IED. Networking and communication devices may also be integrated into an IED and/or be in communication with an IED. As used herein, an IED may include a single discrete IED or a system of multiple IEDs operating together. The systems and method described herein may be incorporated within, implemented by, or embodied as an IED. An IED may be configured to perform the calculations and/or measurement necessary to perform the universal power flow modeling and/or calculations described herein.

In some embodiments, an IED may utilize calculations and/or models created using the universal power flow modeling and/or calculations described herein to perform a protection or monitoring function. Similarly, an IED may utilize or perform calculations and/or models based on the universal power flow modeling to modify or update a monitoring or protection schema.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

As used herein, the term "IED" may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term "IED" may be used interchangeably to describe an individual IED or a system comprising multiple IEDs.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special purpose processing device, such as an ASIC, PAL, PLA, PLD, Field Programmable Gate Array, or other customized or programmable device. The computer may also include a computer-readable storage device, such as non-volatile memory, static RAM, dynamic RAM, ROM, CD-ROM, disk, tape, magnetic, optical, flash memory, or other computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism.

Aspects of certain embodiments described herein may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc. that perform one or more tasks or implement particular abstract data types.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

Some of the embodiments of the disclosure can be understood by reference to the drawings, wherein like parts are generally designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. Well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

FIG. 1 illustrates a simplified one-line diagram of an electric power delivery system, according to one embodiment. The illustrated diagram is similar to the IEEE 9-bus system. The system includes a first bus 102 in electrical communication with a first generator 122, which is in electrical communication with a fourth bus 108 through a first transformer 142. A second generator 124 is in electrical communication with a second bus 104, which is in electrical communication with a seventh bus 114 through a second transformer 144. A third generator 126 is in electrical connection with a third bus 106, which is in electrical communication with a ninth bus 118 through a third transformer 146. The seventh bus 114 is in electrical communication with the ninth bus 118 via the eighth bus 116. The seventh bus 114 is in electrical communication with a fifth bus 110. The ninth bus 118 is in electrical communication with sixth bus 112. Both the ninth bus 118 and the sixth bus 112 are in electrical communication with the fourth bus 108. The fifth bus 110 is in electrical communication with a first load 130. The sixth bus 112 is in electrical communication with a second load 132. The eighth bus 116 is in electrical communication with a third load 134.

For ease of discussion in the load flow calculations described hereunder, Table A shows the translation of the element numbers illustrated in FIG. 1 and the element names according to the IEEE 9-bus system:

TABLE A

| FIG. 1 Element Number | IEEE 9-Bus System Elements |
| --- | --- |
| 102 | Bus 1 |
| 104 | Bus 2 |
| 106 | Bus 3 |
| 108 | Bus 4 |
| 110 | Bus 5 |
| 112 | Bus 6 |
| 114 | Bus 7 |
| 116 | Bus 8 |
| 118 | Bus 9 |
| 122 | Generator 1 |
| 124 | Generator 2 |
| 126 | Generator 3 |
| 130 | Load A |
| 132 | Load B |

TABLE A-continued

| FIG. 1 Element Number | IEEE 9-Bus System Elements |
| --- | --- |
| 134 | Load C |
| 142 | Transformer 1 |
| 144 | Transformer 2 |
| 146 | Transformer 3 |

The simplified electric power system illustrated in FIG. 1 may be an islanded system, such as an industrial system or a microgrid. In such an embodiment, the generators 122, 124, and 126 provide electric power to loads 130, 132, and 134.

Various embodiments of the universal power flow algorithms may be used to monitor a system similar to that illustrated in FIG. 1. However, it is appreciated that the universal power flow systems and methods described herein may be applied as described and/or with minor adaptation to a wide variety of electrical system configurations, including but not limited to microgrids, industrial facilities, oil platforms, etc.

Figure 2:
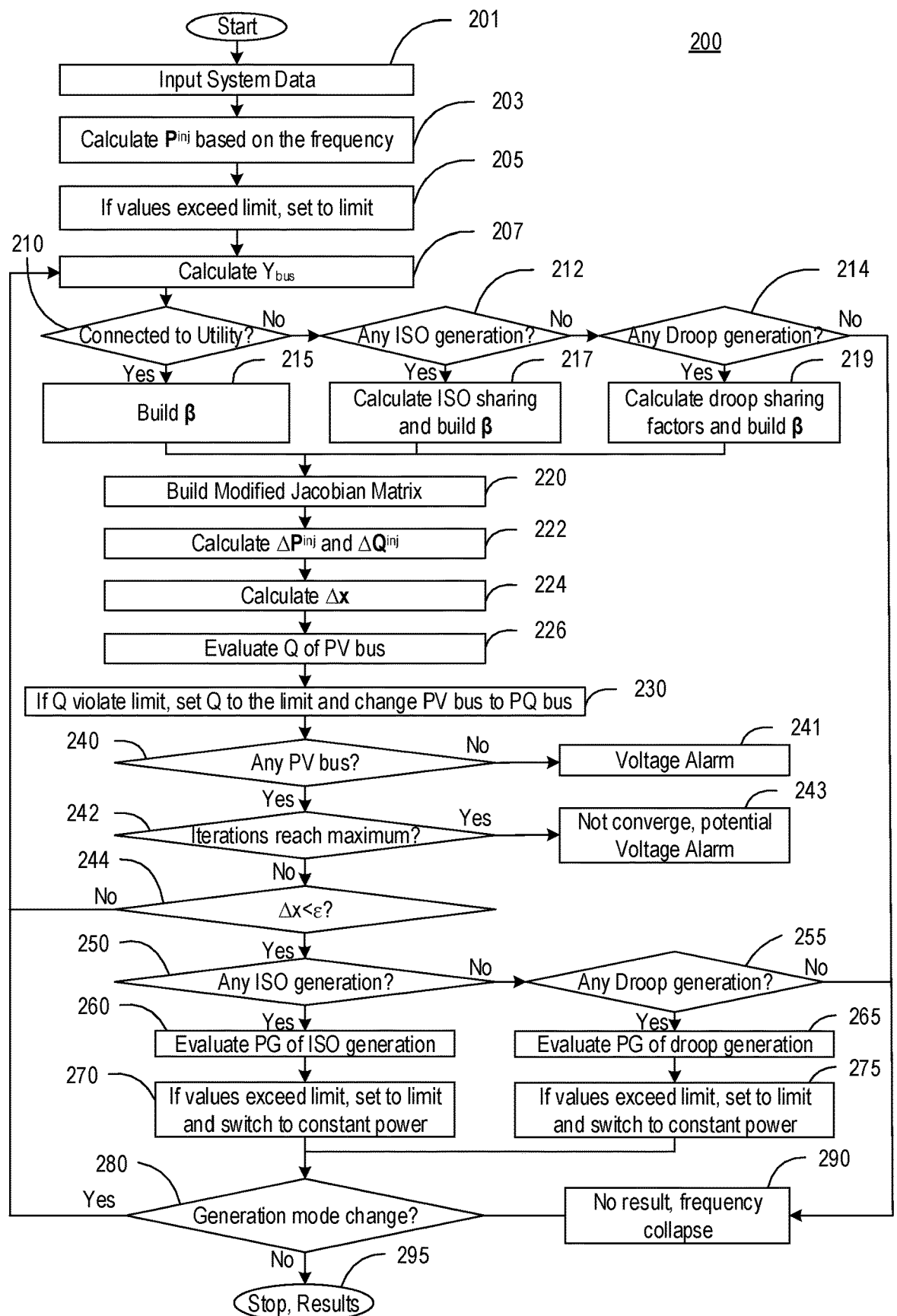
FIG. 2 illustrates a flow chart of a method for power flow monitoring, modeling, and/or control, according to various embodiments.

FIG. 2 illustrates a flow chart of a method 200 for power flow modeling, monitoring, and/or control, according to various embodiments. As illustrated, system data may be input, at 201, that identifies various buses, interconnections, loads, and/or generator units. The input system data may provide a topology of the electrical power delivery system and may include various measured data such as voltages, currents, frequencies, synchrophasors, and the like.

A bus injection power, $P^{inj}$, may be calculated, at 203, for one or more buses on the electrical power delivery system based on measured or reported frequency values. If the values exceed system limits, a controller may set the values to the limit, at 205. The $Y_{bus}$ may be calculated, at 207, based on whether the system is connected to the utility, at 210, includes ISO generation if not grid-connected, at 212, or includes droop generation if not grid-connected, at 214. If the system is determined to be not grid-connected but have no ISO or droop generation, then frequency collapse may be reported, at 290, and the modeling may be unable to provide results until there is a generation mode change, at 280.

If the system is grid connected, at 210, then $\beta_i$ coefficients may be calculated, at 215. A Jacobian matrix may be built, at 220 and changes in the injection power, $P^{inj}$, and reactive power may be calculated, at 222. As noted above, $p_i$ is the coefficient of X. and is based on the control mode of distributed generators and the operating mode of the system. X is the power shortage of the system, $P_s$, if the system is grid-connected or islanded with ISO generation. X is equal to $f_{pu}$ if the system is islanded without ISO generation. A change in X may be calculated, at 224, and then the reactive power Q of the bus may be evaluated as if it is a PV or generator bus, at 226. Again, if the calculated reactive power Q violates a limit, the bus may be set to the limit, at 230, and identified as a PQ or load bus. If there is no PV or generator bus, at 240, then a voltage alarm may be raised, at 241. If there is a PV bus, at 240, and iterative calculations have reached a maximum, at 242, then there is no convergence and a voltage alarm may be raised, at 243.

Otherwise, if the change in X is less than ε, at 244, then the system can be evaluated to determine if there is ISO generation, at 250, or droop generation, at 255. If there is ISO generation, at 250, then the power generation of ISO generators may be evaluated, at 260, and if the power generation exceeds a limit, a controller may set it to a limit and switch to constant power, at 270.

If there is droop generation, at 255, the power generation of droop generation may be evaluated, at 265. If the power generation of the droop generators exceeds a limit, a controller may set it to the limit and switch to constant power, at 275. The system may be reevaluated if there is a mode change, at 280, otherwise, the analysis is completed, at 295.

Figure 3:
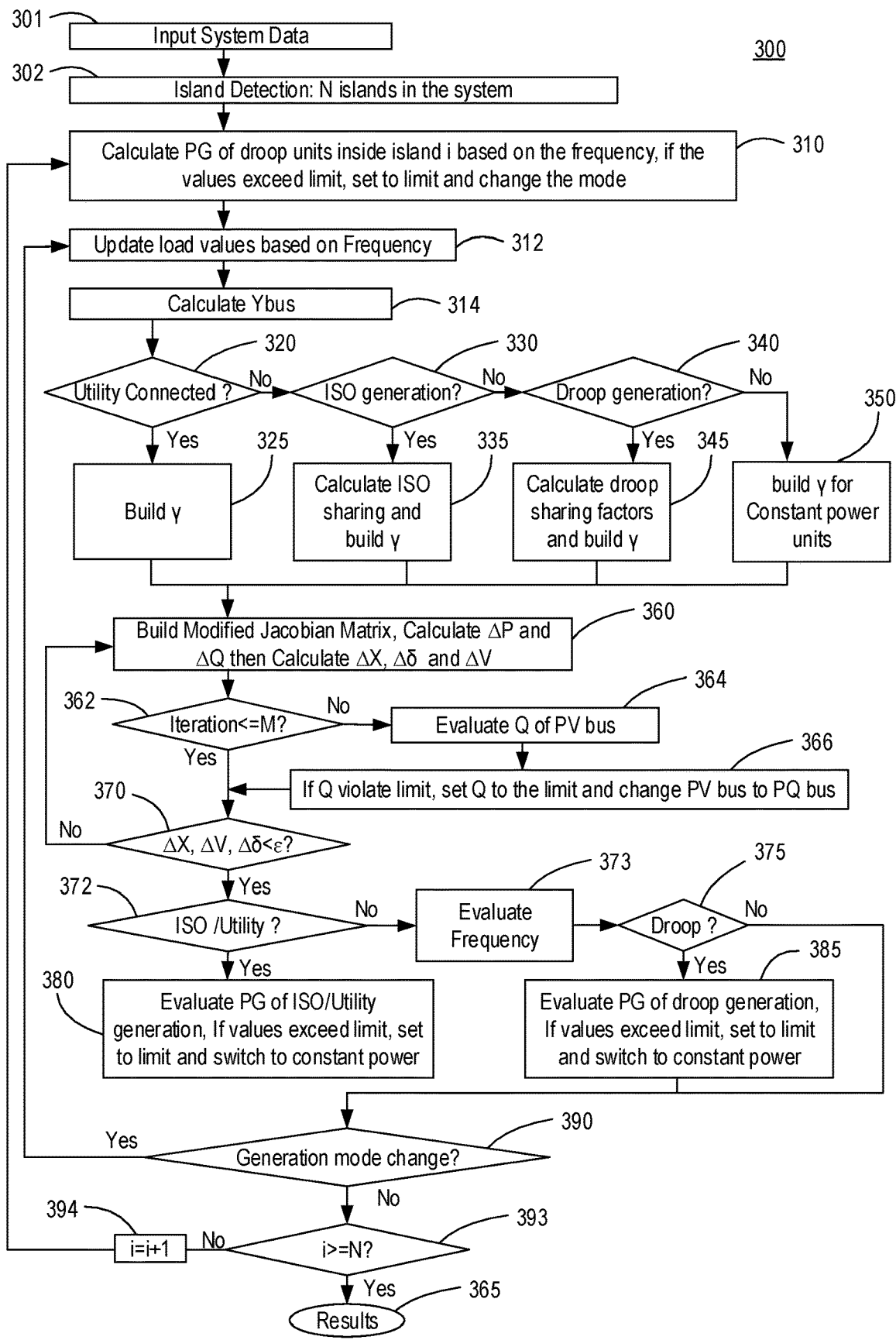
FIG. 3 illustrates a flow chart of another example of a method for power flow monitoring, modeling, and/or control, according to various embodiments.

FIG. 3 provides a flow chart of another example of a method 300 for power flow monitoring, modeling, and/or control, according to various embodiments. FIG. 3 utilizes many of the notations in the preceding equations. However, it is appreciated that the specific equations may be adapted or modified. Moreover, the method 200 in FIG. 2 and the variations presented in the method 300 in FIG. 3 may be interchangeable in many situations. Moreover, it is appreciated that not all steps may need to be performed every time, depending on the desired results, monitoring functions, and known states of a system. As a simple example, if it is known that a system is never utility-connected because it is an isolated system (e.g., an oil platform), many of the steps can be skipped. Similarly, if generators report operating in droop mode, then steps can be skipped for a faster evaluation based on the known state of the generator.

As illustrated in FIG. 3, a topology of the system and/or other input system data may be provided, at 301. Input system data may include breaker statuses, voltage measurements, current measurements, frequency measurements, bus states, etc. A controller, such as an IED, may determine the number of islands in the system, at 302. The power generation of droop units within an islanded system i may be calculated, at 310. Frequency-dependent load values may be updated based on the frequency of the system, at 312, and a $Y_{bus}$ may be calculated, at 314. If the system is utility connected, at 320, then a γ-vector may be built based on the operating mode, at 325. If the system includes ISO generation, at 330, then ISO sharing is calculated and a γ-vector is built based on the operating mode, at 335. If the system includes droop generation, then the droop sharing is calculated and a γ-vector is built based on the operating mode, at 345. Otherwise, a γ-vector is built based on the constant power operating mode, at 350.

A modified Jacobian Matrix may be built, at 360, based on the principles and approached described herein. The power shortage of the system, active power generation, reference angles, coefficients, voltage magnitudes, and/or reactive power generation may be calculated, based on operating mode, as well, at 360. If the analysis iterations are greater than M, at 362, where M is the number of generation units connected to a bus, then the reactive power of a PV bus may be evaluated, at 364. If the reactive power, Q, exceeds a limit, then Q may be set to a limit and the bus may be identified as a PQ bus.

If the changes in coefficients, voltages, and angles of the bus are great than ε, at 370, then the process may be repeated for the next bus. Otherwise, the system may be evaluated to determine if it is operating in ISO mode or utility-connected mode, at 372. In either of these modes, the power generation of ISO generators may be evaluated and switched to constant power mode if it exceeds a threshold value, at 380. If it is not in ISO or utility-connected mode, at 372, the frequency may be evaluated, at 373, to determine if the system is in droop mode, at 375. If the system is in droop mode, at 375, then the power generation of the droop generators may be evaluated, at 385. If the generation mode is changed, at 390, then the analysis may be repeated, at 390. If all of the buses have been evaluated, at 393, then the analysis ends, at 395. Otherwise, the analysis is repeated, at 394 for the next bus in the system.

Figure 4:
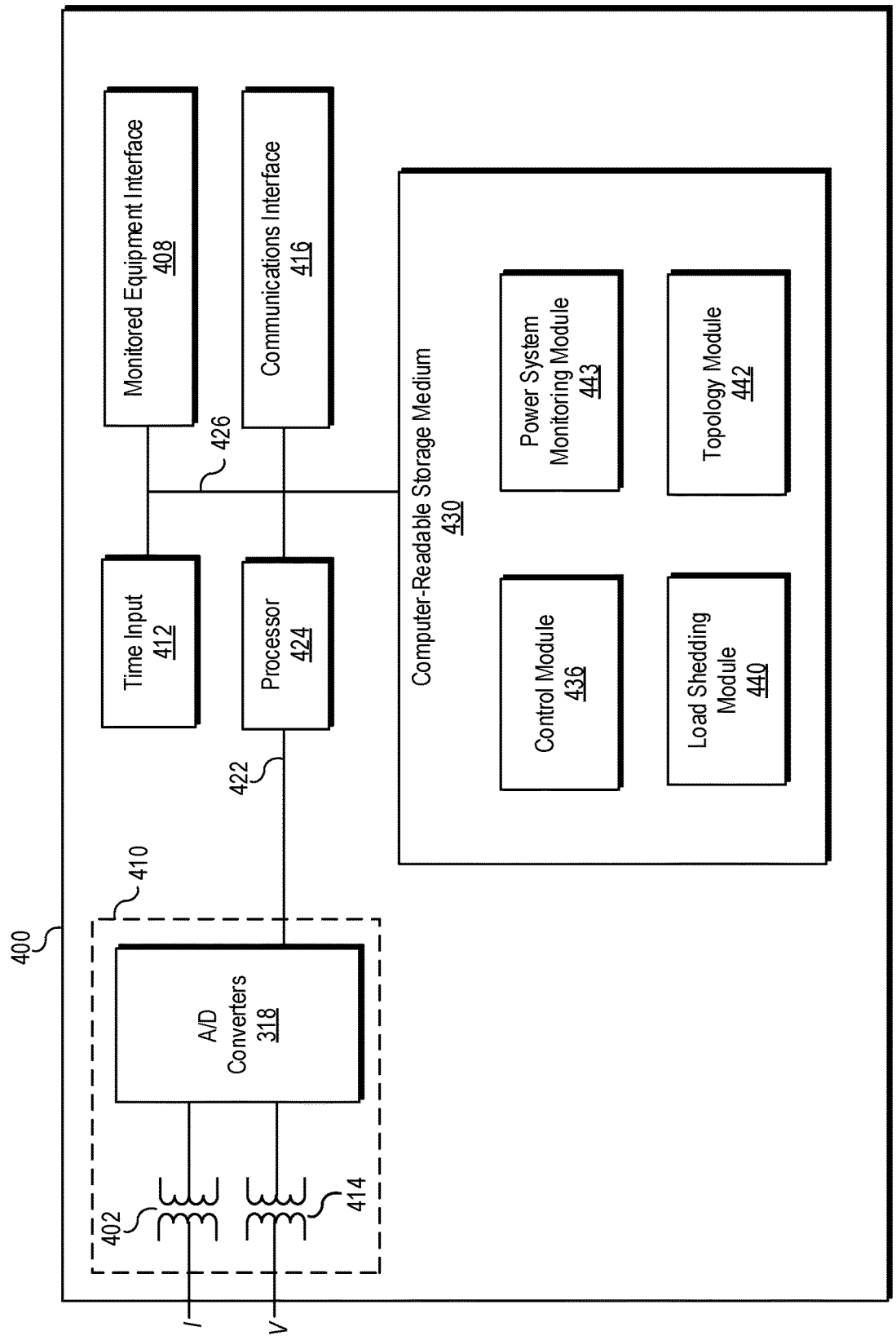
FIG. 4 illustrates an embodiment of a functional block diagram of a system operable to manage a power system.

FIG. 4 illustrates a functional block diagram of a system 400 operable to manage a power system consistent with the present disclosure. In certain embodiments, the system 400 may comprise or even be embodied as an IED, IED system, or plurality of IEDs configured to, among other things, detect faults using traveling waves and estimate a location of the fault. System 400 may be implemented using hardware, software, firmware, and/or any combination thereof. Moreover, certain components or functions described herein may be associated with other devices or performed by other devices. The specifically illustrated configuration is merely representative of one embodiment consistent with the present disclosure.

System 400 includes a communications interface 416 configured to communicate with other IEDs and/or system devices. In certain embodiments, the communications interface 416 may facilitate direct communication with another IED or communicate with another IED over a communications network. Communications interface 416 may facilitate communications with multiple IEDs. IED 400 may further include a time input 412, which may be used to receive a time signal (e.g., a common time reference) allowing IED 400 to apply a time-stamp to the acquired samples. In certain embodiments, a common time reference may be received via communications interface 416, and accordingly, a separate time input may not be required for time-stamping and/or synchronization operations. One such embodiment may employ the IEEE 1588 protocol. A monitored equipment interface 408 may be configured to receive status information from, and issue control instructions to, a piece of monitored equipment (such as a circuit breaker, conductor, transformer, or the like).

Processor 424 may be configured to process communications received via communications interface 416, time input 412, and/or monitored equipment interface 408. Processor 424 may operate using any number of processing rates and architectures. Processor 424 may be configured to perform various algorithms and calculations described herein, such as perform the various calculations associated with the universal power flow algorithms described herein. Processor 424 may be embodied as a general purpose integrated circuit, an application specific integrated circuit, a field-programmable gate array, and/or any other suitable programmable logic device.

In certain embodiments, system 400 may include a sensor component 410. In the illustrated embodiment, sensor component 410 is configured to gather data directly from a conductor (not shown) and may use, for example, transformers 402 and 414 and A/D converters 418 that may sample and/or digitize filtered waveforms to form corresponding digitized current and voltage signals provided to data bus 422. A/D converters 418 may include a single A/D converter or separate A/D converters for each incoming signal. A current signal may include separate current signals from each phase of a three-phase electric power system. A/D converters 418 may be connected to processor 424 by way of data bus 422, through which digitized representations of current and voltage signals may be transmitted to processor 424. In various embodiments, the digitized current and voltage signals may be used to calculate the location of a fault on an electric power line as described herein.

Computer-readable storage medium 430 may be the repository of various software modules configured to perform any of the methods and/or implement any of the algorithms described herein. A data bus 442 may link monitored equipment interface 408, time input 412, communications interface 416, and computer-readable storage mediums 426 and 430 to processor 424.

A load shedding module 440 may be configured to identify circumstances in which shedding of load is appropriate to maintain a balance between electrical generation and demand. A topology module 442 may be configured to determine a topology of an electrical power generation and distribution system. Further, power system monitoring module 443 may operate in conjunction with topology module 442 to identify events in the electrical power generation and distribution system and determine changes in the topology of the system. Topology module 442 may be configured to identify nodes, operational modes, islanded systems, grid-connections, and the like in the electrical power generation and distribution system. According to some embodiments, topology module 442 may implement other algorithms for identify nodes associated with islands.

Furthermore, power system monitoring module 443 may implement one or more of the steps described of the methods described in conjunction with FIGS. 2 and 3 herein. The system 400, via processor 424, power system monitoring module 443, topology module 442, and/or any other number of additional modules may implement any of various calculations, estimations, evaluations, and/or determinations described herein as part of a universal power flow algorithm for monitoring, modeling, and/or controlling an electrical transmission and/or distribution system.

Power system monitoring module 443 may comprise any number of modules or sub-modules that are each configured to implement a portion of a universal power flow algorithm. For example, a sub-module for detecting an island, as per step 302 in FIG. 3, may be referred to as an island detection module. Similarly, a frequency evaluation module may be so named because it implements step 373 of FIG. 3 by evaluating a frequency. For sake of brevity, all possible names of modules or sub-modules for implementing each possible step or portion of the various embodiments of the universal power flow algorithm described herein are not exhaustively listed.

Figure 5:
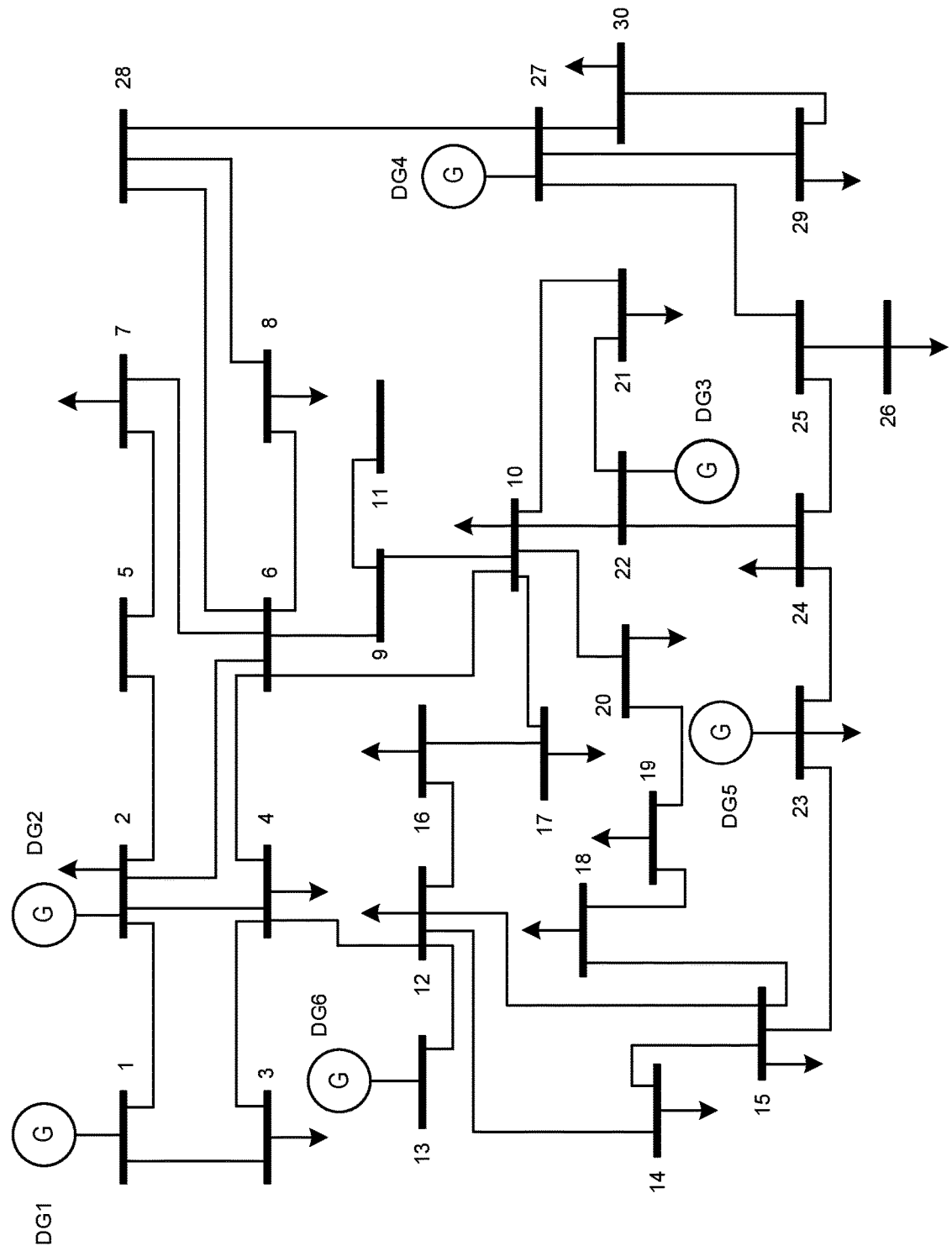
FIG. 5 illustrates a simplified example of the IEEE 30 Bus System with six generators and forty-one lines.

FIGS. 5-16 relate to validation testing performed to confirm the functionality of the universal power flow algorithm described herein. The universal power flow algorithm was implemented in MATLAB® and validated using the IEEE 30 bus system, a simplified version of which is shown in FIG. 5. Tables 6-16 illustrate results of the setup and system states compared with those obtained by Real-Time Digital System (RTDS) integration methods. Data in the tables is expressed in per unit and the base for active power and reactive power are 100 MW and 100 MVar, with the base for the voltage at the rated voltage value of the bus.

FIG. 5 illustrates a simplified example of the IEEE 30 Bus System with six generators and forty-one lines.

FIG. 6 includes Table I that shows generator capacity and droop values for each of the six generators in FIG. 5 of the 30 Bus System, according to one embodiment.

FIG. 7 includes Table II with generation results fora multiple islanded mode for the 30 Bus System with one large island and one small island, according to one embodiment. With reference to the 30 Bus System shown in FIG. 5, the results shown in Table II are from a simulation in which the line connecting Bus 24 and Bus 25 and the line connecting Bus 27 and Bus 28 are tripped. In such a scenario, the system is separated into two isolated islands, including a first island with five distributed generators (DGs) and as second island with one DG. In the simulation, DG1 and DG3 are operated in ISO mode and the other DGs are operated in droop mode.

FIG. 8 includes Table III showing voltage results for the multiple islanded mode for the 30 Bus System described in conjunction with FIG. 7 with the first island with five DGs and the second island with one DG.

FIG. 9 includes Table IV showing generation results for the 30 Bus System connected to a 60 Hz grid to provide infinite active and reactive power support, according to one embodiment. In this scenario, all of the DGs produce active power equal to their reference set points.

FIG. 10 includes Table V showing voltage results for the 30 Bus System connected to the 60 Hz grid to provide infinite active and reactive power support, according the embodiment described in conjunction with FIG. 9.

FIG. 11 includes Table VI showing generation results for the 30 Bus System in droop mode with DG3 is modified from providing 21.59 MW to 50 MW, according to one embodiment. Table VI shows the generation results of droop sharing and compares them with the results obtained from RTDS.

FIG. 12 includes Table VII showing voltage results for the 30 Bus System in droop mode, according the embodiment described in conjunction with FIG. 11. Specifically, Table VII shows the voltage results of critical buses and confirms that the results obtained by the universal power flow algorithm match those obtained using RTDS.

FIG. 13 includes Table VIII and shows generation results for the 30 Bus System in another embodiment of a droop mode with DG2 decreased from 60.97 MW to 10.97 MW and the turbine limit of DG6 being modified from 80 MW to 40 MW.

As illustrated in Table VIII, and Table IX shown in FIG. 14, DG6 reaches its maximum active power limit and DGs1-5 share the remaining power. The results of the universal power flow algorithm, as described herein, are again confirmed accurate relative to the RTDS method.

FIG. 15 includes Table X showing the generation results for the 30 Bus System with the maximum reactive power limit of DG2 decreased from 60MVar to 25 MVar.

FIG. 16 includes Table XI showing the voltage results for the 30 Bus System, including DG2 at its maximum reactive power limit, at which point the voltage of Bus 2 is relaxed to 0.997 pu.

In each of the above examples, the RTDS results confirm the accuracy of the universal power flow algorithm described herein. The universal power flow algorithm described herein is capable of accurately evaluating power flow states and system frequency with consideration of operating modes of the system, control strategies, active power limits of DG units, reactive power limits of DG units, and the like. As described and shown by validation herein, the universal power flow algorithm and associated analysis approach is uniquely capable of calculating power flow of both grid-connected and islanded systems having various control strategies, including ISO, droop, and constant power control modes. Active and reactive power limits of DGs are accounted for and the evaluation may provide alarms, alerts, and/or other notifications regarding voltage and/or frequency irregulates or deviations. In various embodiments, the universal power flow algorithm may be used to monitor, model, and/or control one or more components within a power distribution system.

The examples and illustrations provided relate to specific embodiments and implementations of a few of the many possible variations. It is understood that the disclosure is not limited to the precise configurations and components disclosed herein. Accordingly, many changes may be made to the details of the above-described embodiments without departing from the underlying principles of this disclosure. The scope of the present invention should, therefore, be determined in the context of the possible claims that are supportable by this disclosure, including the following:

What is claimed is:

1. A system for monitoring and controlling an electric power delivery system, comprising:
   a data bus;
   a processor in communication with the data bus; and
   a non-transitory computer readable storage medium in communication with the data bus, the non-transitory computer readable storage medium storing information comprising:
     a topology of the electric power delivery system comprising information on a plurality of buses of the electric power delivery system;
     a power system monitoring module configured to:
       determining a control strategy of the electric power delivery system as one of ISO control, droop control, and constant power control; and
       calculate an active power generation reference value, $P_i^{Ref}$, for each of a plurality of buses based on a function of a frequency-based load value, a control-operating value, a voltage on each of the plurality of buses, and an angle of the power on each of the plurality of buses;
       calculate a reactive power generation reference value, $Q_i^{Ref}$, for each of the plurality of buses based on a function of the frequency-based load value, control-operating value, voltage on each of the plurality of buses, and angle of the power one each of the plurality of buses; and
     a control module configured to determine a control action to be executed based on a calculated active power generation reference value, $P_i^{Ref}$ for at least one of the plurality of buses; and
   a transmitter to transmit the control action via the data bus to a power component within the electric power delivery system.

2. The system of claim 1, wherein the power generation reference value, $P_i^{Ref}$ for each of a plurality of buses is calculated by:
   obtaining a measured frequency value of power on a bus, i, of an electric power delivery system;
   calculating the frequency-based load value based on the measured frequency value and a percentage of a load on the bus, i, that is frequency-dependent;
   obtaining data identifying the control strategy of the electrical power delivery system in terms of an operating mode and a control mode of the electric power delivery system;
   calculating a control-operating value based on a product of a control-mode coefficient, $\beta_i$, and an operating value, X, of at least one generator connected to the bus, i;
   obtaining data identifying a voltage of the power on the bus, i;
   obtaining data identifying an angle of the power on the bus, i;
   calculating an active power generation reference value, $P_i^{Ref}$ based on the sum of the calculated frequency-based load value, the calculated control-operating value, and the identified voltage and angle of the power on the bus, i.

3. The system of claim 2, wherein the frequency based load value is calculated to satisfy the expression:

$$(c_{1i}f_{pu}^2 + c_{2i}f_{pu} + c_{3i})P_{Load\_i}^N,$$

where
   $c_{1i}$ represents a percentage of a load on the bus, i, that varies quadratically with respect to the measured frequency value,
   $c_{2i}$ represents a percentage of the load on the bus, i, that varies linearly with respect to the measured frequency value,
   $c_{3i}$ represents a percentage of the load on the bus, i, that is frequency independent,
   $f_{pu}$ represents the frequency value in per unit of the power on the bus, i, and
   $P_{Load\_i}^N$ represents the active power value of the load on the bus, i, at nominal frequency.

4. The system of claim 2, wherein the identified voltage and angle of the power on the bus are used to calculate a shared value, wherein the shared value, $S_v$, is calculated to satisfy the expression:

$$S_v = |V_i|\Sigma_{n=1}^N |Y_{in}||V_n|\cos(\delta_i - \delta_n - \theta_{in}),$$

where
   $|V_i|$ is the voltage magnitude on the bus, i,
   N represents a total number of buses in the electric power delivery system, such that n represents bus n, of the total N buses in the electric power delivery system during mathematical summation,
   $|Y_{in}|$ is the magnitude of a Y bus matrix element related to the bus, i, and bus n,
   $\theta_{in}$ is an angle of a Y bus matrix element related to the bus, i, and bus n,
   $\delta_i$ is an angle of the bus, i, and
   $\delta_n$ is an angle of bus n.

* * * * *